(12) United States Patent
Prydekker et al.

(10) Patent No.: US 9,485,672 B2
(45) Date of Patent: Nov. 1, 2016

(54) CONTEXT AWARE WIRELESS DATA ACCESS POINT CHANGEOVER

(75) Inventors: Ralph Prydekker, Wilmot, NH (US); James T. Geier, Yellow Springs, OH (US)

(73) Assignee: Draeger Medical Systems, Inc., Andover, MA (US)

( * ) Notice: Subject to any disclaimer, the term of this patent is extended or adjusted under 35 U.S.C. 154(b) by 95 days.

(21) Appl. No.: 14/374,175

(22) PCT Filed: Jun. 15, 2012

(86) PCT No.: PCT/US2012/042754
§ 371 (c)(1),
(2), (4) Date: Jul. 23, 2014

(87) PCT Pub. No.: WO2013/112193
PCT Pub. Date: Aug. 1, 2013

(65) Prior Publication Data
US 2014/0341043 A1 Nov. 20, 2014

Related U.S. Application Data

(60) Provisional application No. 61/590,623, filed on Jan. 25, 2012.

(51) Int. Cl.
*H04L 1/00* (2006.01)
*H04W 24/02* (2009.01)
(Continued)

(52) U.S. Cl.
CPC .......... *H04W 24/02* (2013.01); *H04L 41/0816* (2013.01); *H04W 36/0027* (2013.01); *H04W 36/08* (2013.01); *H04W 36/24* (2013.01); *H04W 64/00* (2013.01); *H04W 84/12* (2013.01)

(58) Field of Classification Search
CPC .................................................. H04L 41/0816
USPC .......................................................... 370/241
See application file for complete search history.

(56) References Cited

U.S. PATENT DOCUMENTS

2005/0136928 A1* 6/2005 Zaki ...................... H04W 36/26
455/436
2006/0287586 A1* 12/2006 Murphy .............. G06F 19/3418
600/300

(Continued)

FOREIGN PATENT DOCUMENTS

WO WO-2005/099173 A1 10/2005
WO WO-2009/095832 A1 8/2009

OTHER PUBLICATIONS

Wu H et al: "Proactive Scan: Fast Handoff with Smart Triggers for 802.11 Wireless LAN", INFOCOM 2007. 26th IEE Interntional Conference on Computer Communications. IEEE, IEEE, PI, May 1, 2007 (May 1, 2007), pp. 749-757, XP031093629, DOI: 10.1109/INFCOM.2007.93 ISBN: 978-1-4244-1047-7 abstract figures 1, 11 II. Problem definitions and related work III. Our approach IV. Triggers for proactive scan (B. Scan trigger and handoff trigger) V. Proactive scan.

(Continued)

*Primary Examiner* — Shripal Khajuria
(74) *Attorney, Agent, or Firm* — Jones Day (57) ABSTRACT

A first wireless connection is initiated between a station and a first access point (410). During this first wireless connection, data packet traffic is monitored from other access points (420). It is repeatedly determined (430), by the station using the monitored data packet traffic and during the first wireless connection, which of the other access points provides a best data transmission profile. Thereafter, the station automatically transitions (440) from the first wireless connection to a second wireless connection with the access point having the most recently determined best data transmission profile upon occurrence of a trigger event or a termination of the first wireless connection. Related apparatus, systems, methods and articles are also described.

21 Claims, 4 Drawing Sheets

(51) Int. Cl.
  *H04W 36/08* (2009.01)
  *H04L 12/24* (2006.01)
  *H04W 36/00* (2009.01)
  *H04W 36/24* (2009.01)
  *H04W 64/00* (2009.01)
  *H04W 84/12* (2009.01)

(56) References Cited

U.S. PATENT DOCUMENTS

2010/0151920 A1\* 6/2010 Song ............... H04W 52/0216
  455/574
2013/0090115 A1\* 4/2013 Deivasigamani ..... H04W 48/20
  455/434

OTHER PUBLICATIONS

Wisniewski L et al: "Location-based handover in cellular IEEE 802.11 networks for Factory Automation", Emergin Technologies and Facory Automation (ETFA), 2010 IEEE Conference on, IEEE, Piscataway, NJ, USA, Sep. 13, 2010 (Sep. 13, 2010), pp. 1-8, XP031937240, DOI: 10-1109/EFA.2010.5641296 ISBN: 978-1-4244-6848-5 abstract 2. Background 3.2 the TDoA technique analaysis figures 1, 2.

Pack S et al: "Fast handoff scheme based on mobility prediction in public wireless LAN systems—WLAN systems and interworking", IEE Proceedings: Communications, Institute of Electrical Engineers, GB, vol. 151, No. 5, Sep. 15, 2004 (Sep. 15, 2004), pp. 489-495, XP006022626, ISSN: 1350-2425, DOI: 10-1049/IP-COM:20040834 abstract 1 Introduction 2.1 design principles 2.2 FHR selection algorithm.

Jong-Tae Park et al: "Context-Aware Handover with Power Efficiency for u-Healthcare Service in WLAN", New Trends in Information and Service Science, 2009. NISS '09. International Conference on, IEEE, Piscataway, NJ, USA, Jun. 30, 2009 (Jun. 30, 2009), pp. 1279-1293, XP031530960, ISBN:978-0-7695-3687-3 absract I. Introduction III. Algorithm for context-aware handover in WLAN figures 1, 3 table I.

International Search Report issued in PCT/US2012/042754, dated Aug. 17, 2012.

\* cited by examiner

CONTEXT AWARE WIRELESS DATA ACCESS POINT CHANGEOVER

RELATED APPLICATION

This application is a national stage application, filed under 35 U.S.C. §371, of International Application No. PCT/US2012/042754 filed on Jun. 15, 2012, which claims priority to U.S. Pat. App. Ser. No. 61/590,623 filed on Jan. 25, 2012, the contents of which are hereby fully incorporated by reference.

FIELD

This subject matter described herein generally relates to context aware wireless data access point changeovers that are effected by continual monitoring of available wireless network access points during an active connection.

BACKGROUND

Typical wireless devices utilizing protocols such as WiFi (i.e., the IEEE 802.11 standard, etc.) do not actively monitor other available wireless access points during an active connection. With such an arrangement, a wireless device monitors available access points (e.g., via beaconing signals, etc.) only after termination of a first wireless connection with an access point. Such an arrangement can result in delayed changeover among access points and, in some cases, loss of data.

Loss of data is particularly problematic with medical systems that allow the physiologic data of multiple, remotely-located patients to be monitored from a central location are known in the art. Such systems are being increasingly adopted and acquire physiologic data of respective patients and transmit the data over a radio frequency RF (i.e. wireless) link to a centralized monitoring station. This physiologic data can include, for example, real-time electrocardiograph (ECG) waveforms, blood pressure, pulse oximetry, respiratory rate, $CO_2$ levels, temperature readings and the like. In the transmission and reception of real-time physiologic data over a network, link disruption, the loss of network connections without warning, the failure to establish network connections or even a slight degradation of service/signal in the network can have serious consequences for time-critical medical data.

SUMMARY

In one aspect, a first wireless connection is initiated between a station and a first access point. During this first wireless connection, data packet traffic is monitored from other access points. It is repeatedly determined, by the station using the monitored data packet traffic and during the first wireless connection, which of the other access points provides a best data transmission profile. Thereafter, the station automatically transitions from the first wireless connection to a second wireless connection with the access point having the most recently determined best data transmission profile upon occurrence of a trigger event or a termination of the first wireless connection.

The station can alternately operate in an active mode in which it transmits and receives data via the first wireless connection and in a monitor mode in which it receives the monitored data packet traffic. The station, while in monitor mode, can receive the monitored data packet traffic via radio frequency.

The station can communicate with the access points via at least one IEEE 802.11 protocol including, for example, IEEE 802.11a protocol, IEEE 802.11b protocol; IEEE 802.11d protocol; IEEE 802.11g protocol; IEEE 802.11i protocol, IEEE 802.11n protocol, and IEEE 802.11ac protocol.

The monitored data packet traffic can comprise packets such as broadcast packets, multicast packets, TCP (Transmission Control Protocol) packets, UDP (User Datagram Protocol) packets, ARP (Address Resolution Protocol) packets, ICMP (Internet Control Message Protocol) packets, DHCP (Dynamic Host Configuration Protocol) packets, DNS (Domain Name System) packets, and RIP (Routing Information Protocol) packets.

The monitored packet traffic can comprises beacon packets transmitted by the access points. In such cases, timestamp information associated with the station can be assigned to each of the beacon packets arriving from access points within range. The timestamp information can include arrival time and beacon interval for each beacon packet transmission. A drift rate can then be calculated based on relative differences in the timestamp information corresponding to each beacon packet in comparison with the timestamp information corresponding to other beacon packets. This calculated drift rate can be used as part of the data transmission profile for each access point (which in turn can be used to select the access point for the second wireless connection).

The monitored data packet traffic can additionally or alternatively be analyzed to identify spatial profiling information contained in corresponding data packets which is representative of variations over time of network transmission performance. The spatial profiling information includes at least one of an identified location of the station, data throughput rate throughout the network, and data retransmission rate throughout the network. The analyzed spatial profiling information can then be used as part of the data transmission profiles for each access point (which in turn can be used to select the access point for the second wireless connection). The identified location of the station can be determined using a triangulation method based on variations over time in power corresponding to the monitored data packet traffic.

The station can be a patient monitoring device that is coupled to at least one sensor device measuring at least one physiological parameter of a patient. With such a patient monitoring device. The monitoring of the data packet traffic of other access points can be initiated/occur when data traffic on the first wireless connection falls below a pre-determined threshold.

In addition, available data transmission profiles can be ranked with the selected best transmission profile having the best ranking. The ranking can be based on numerous factors including, for example, historical connections by the station with one or more of the available access points and/or a determined position of the station relative to one or more of the available access points.

In addition, various apparatus and systems are provided that include one or more of the station and the access points in order to implement various aspects described herein.

In various aspects, the present disclosure is directed to a system, method, and apparatus that incorporates a packet sniffer directly into an STA (for example, a portable patient monitoring device) to apply performance metrics, and thus potentially useful for evaluation and decision making purposes, wherein the STA analyzes the captured information. Then, the STA can be set to RF Monitor mode (RFMON) of operation.

In monitor mode, the STA can perform network surveillance to capture and process data. Acquired information can be used by each STA in the network to make independent decisions regarding network activity actions in a dynamic, real-time manner. Examples of actions taken by the individual STAs can include, but are not limited to, association/re-association/dissociation decisions, switching channels, switching access points, etc.

Acquiring network metrics at the STA, instead of at (or in addition to) a remote wireless LAN controller, provides the advantage of decentralizing the network communication monitoring function, thus creating a system capable of faster network surveillance through reliance upon the independent decision making capabilities of each STA. This supplemental reliance on the LAN controller allows each STA to independently make network decisions based on each STA's own interaction within the network, as well as based on the other STA s in the network. Moreover, the LAN controller is not burdened with the extra communications monitoring functions and is able to execute other centralized functions and/or back up the STA network surveillance efforts to make network decisions that are not as time-critical. Although there are disadvantages to incorporating a packet sniffer directly into STAs (i.e. increased power consumption, decreased battery run time, increased cost, heat dissipation, etc.) the overall reliability and efficiency of network communications is greatly improved.

In various aspects, the present disclosure is directed to a patient monitoring device for use with a wireless network having more than one wireless access point, each access point communicable with a plurality of devices, the patient monitoring device being coupled to communicate with at least one sensor device associated with a patient for acquisition of at least one physiologic patient parameter. The patient monitoring device comprises a memory; a radio configured to enable bidirectional data communication between the patient monitoring device and the wireless access points in the network. The radio is further configured to monitor network traffic data comprising data packets, capture selected packets from the network traffic being monitored, and store the selected packets captured to the memory. The patient monitoring device includes a control processor programmed to process, display and interpret physiologic data acquired by the sensor, transmit and receive wireless instructions to and from the access point, analyze the captured packets stored to the memory, and select a wireless access point in the network to associate with based on the analyzed network traffic data.

In some aspects, the present disclosure is directed to a method of reducing network data transmission latency between a patient monitoring device having a radio and a control processor, and at least one wireless access point included within a plurality of access points in a wireless network. The method includes monitoring, by the radio, wireless network traffic, including data being transmitted between the radio of the patient monitoring device and the at least one wireless access point associated with the patient monitoring device, the wireless network traffic comprising data packets. The method further includes capturing selected packets from the network traffic being monitored, storing the selected packets captured to a memory on the patient monitoring device, and analyzing, by the control processor, the captured packets stored to the memory. The method further includes selecting between the presently associated access point and an access point selected from the plurality of access points in the wireless network based on the analyzed network traffic data, and associating with the selected access point.

In various aspects, the present disclosure is directed to a patient monitoring system including a wireless network having a plurality of access points, at least one sensor device associated with a patient for acquisition of at least one physiologic patient parameter, and a patient monitoring device. The exemplary patient monitoring device includes a memory, and a radio configured to enable bidirectional data communication between the patient monitoring device and the wireless access points in the network. The radio is further configured to monitor network traffic data comprising data packets, capture selected packets from the network traffic being monitored, and store the selected packets captured to the memory. The patient monitoring device includes a control processor programmed to process, display and interpret physiologic data acquired by the sensor, transmit and receive wireless instructions to the access point, analyze the captured packets stored to the memory, and select a wireless access point in the network to associate with based on the analyzed network traffic data.

In some aspects, the present disclosure is directed to a patient monitoring system for use in a wireless network having a plurality of access points. The system comprises at least one sensor device associated with a patient for acquisition of at least one physiologic patient parameter, and a patient monitoring device. The patient monitoring device includes a memory, and a radio configured to enable bidirectional data communication between the patient monitoring device and the wireless access points in the network. The radio is further configured to monitor network traffic data comprising data packets, capture selected packets from the network traffic being monitored, and store the selected packets captured to the memory. The exemplary patient monitoring device has a control processor programmed to process, display and interpret physiologic data acquired by the sensor, transmit and receive wireless instructions to the access point, analyze the captured packets stored to the memory, and select a wireless access point in the network to associate with based on the analyzed network traffic data.

Articles of manufacture are also described that comprise computer executable instructions permanently stored (e.g., non-transitorily stored, etc.) on computer readable media, which, when executed by a computer, causes the computer to perform operations herein. Similarly, computer systems are also described that may include at least one processor and a memory coupled to the processor. The memory may temporarily or permanently store one or more programs that cause the at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

DETAILED DESCRIPTION

While the current subject matter is described primarily with regard to a clinical setting utilizing portable patient monitors, it will be appreciated that the subject matter described herein can be adapted to any type of wireless device/station which can selectively connect to one or more access points. As used herein, a component that can connect into a wireless medium in a network is referred to as an "STA", "station", or in some cases "wireless device". Stations can be equipped with wireless network interface controllers (WNICs). Wireless stations fall into one of two categories: access points, and clients. Access points (APs), normally routers, are base stations for the wireless network. They transmit and receive radio frequencies as part of wireless connections with stations. Stations can be mobile devices such as laptops, tablet computers (e.g., IPAD, etc.), personal digital assistants, IP phones and other smartphones, or fixed devices such as desktops and workstations that are equipped with a wireless network interface. In some non-limiting examples described herein, a portable patient monitor is used as an example of a station.

A "packet sniffer" (also known as a network analyzer, protocol analyzer, or packet analyzer) is a program and/or device programmed as such designed to capture and record network traffic for diagnostic purposes, for example. One feature of packet sniffers is that they have the ability to switch the network adaptor of the host computer into RF Monitor (RFMON) mode. With the network card in RF Monitor mode, the packet sniffer can see all the network traffic on the segment of the network to which the station is connected and not just traffic destined for that particular machine. One example of a commercially available packet sniffer is Fluke Networks' OptiView® ClearSight Analyzer.

Figure 1:
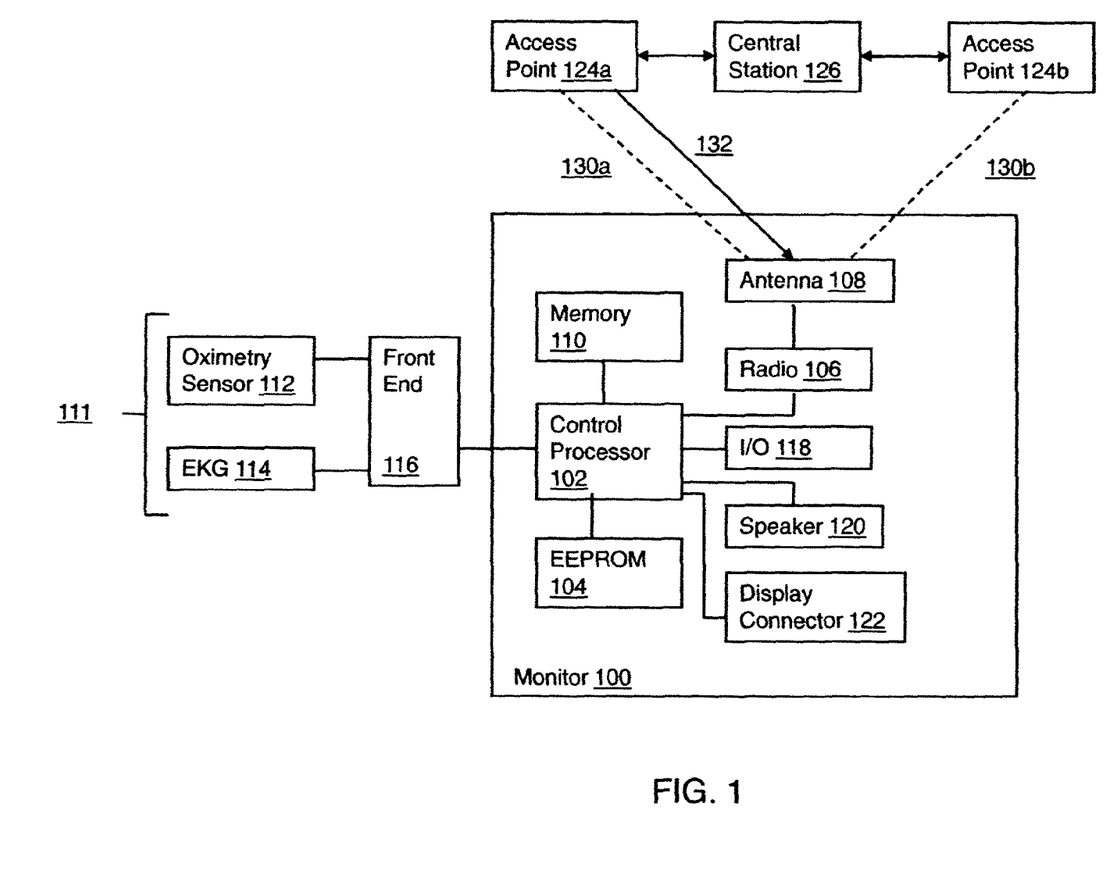
FIG. 1 is a block diagram of a portable patient monitor.

As used herein, "patient monitoring device" refers to a medical device that allows the physiologic data of a patient to be transmitted to a central location as discussed above. FIG. 1 is a diagram illustrating a portable patient monitoring device (hereinafter, "monitor") 100. The monitor 100 includes a control processor 102 and an electrically erasable programmable read only memory (EEPROM) 104 that includes configuration data used by the control processor 102 for controlling monitor operation. In some implementations, some or all of the aspects described herein directed to controlling monitoring operation can be performed in software, for example, in an application layer. The monitor 100 includes a front end 116 that interfaces between a plurality of patient parameter sensors 111 and the monitor 100. As shown herein patient parameter sensors 111 can include, but are not limited to an oximetry sensor 112 that senses an amount of oxygen in a patient's blood and an electrocardiogram (EKG) 114 that selectively monitors electrical impulses generated by the patient's heart. The inclusion of these types of patient sensors 111 is for purposes of example only and any type of patient sensor can be coupled to the front end 116 of the monitor 100 in addition or in place of the oximetry sensor 112 and EKG 114. Additional patient sensors 111 can include at least one of (a) Respiration sensor; (b) Non Invasive Blood Pressure (NIBP) sensor; (c) Invasive Blood Pressure (IBP) sensor; (d) End Tidal Carbon Dioxide (eTCO2) sensor and (e) temperature sensor."

The front end 116 is electrically coupled to the control processor 102. The control processor 102 can provide control information for controlling the operation of the respective patient sensors 111 coupled to the front end 116. The front end 116 also receives data sensed by the patient sensors 111 which is provided back to the patient monitor 100 as patient parameter data. The control processor 102 causes the received patient parameter data to be stored in a memory 110 coupled to the control processor 102. The monitor 100 can also include at least one input/output (I/O) port 118 coupled to the control processor 102 allowing a user to selectively interact with the monitor 100 via an I/O device connected thereto. I/O devices can include, but are not limited to at least one of (a) a keyboard; (b) a mouse; and (c) a touchpad. For example, a user can selective modify operating instructions associated with the patient sensors 111 coupled to the monitor 100. Additionally, a speaker 120 can be coupled to the control processor 102 for outputting an audible alert to notify a user that a certain event is occurring. For example, data sensed by the EKG 114 can be determined to be indicative of atrial fibrillation requiring immediate attention. In this example, the control processor 102 can cause the speaker to output a particular type of alarm to let a user know this condition is occurring in the patient being monitored. Additionally, the patient monitor 100 can include a display connector 122 enabling a display device to be coupled to the monitor 100 allowing for display of at least one of (a) patient parameter data being monitored and (b) device-specific operating information. Alternatively, the monitor 100 can include a display integrally formed therewith.

The monitor 100 includes a radio 106 and an antenna 108 coupled thereto. The radio 106 selectively enables bidirectional communication between the monitor 100 and a central monitoring station 126 via a plurality of wireless access points 124a, 124b. While only two wireless access points 124a and 124b are shown, it will be appreciated that any number of wireless access points can be included depending on the size of the environment in which communication is to occur. The wireless data transmission employed by the radio 106 can be in accordance with the Wireless LAN Medium Access Control and Physical Layer Specification known as IEEE Standard 802.11. This can include, but not limited to, communication protocols such as (a) 802.11a, (b) 802.11b, (c) 802.11g, (d) 802.11n, and (e) 802.11ac. The 802.11 protocol enables the radio 106 to associate the monitor 100 with a respective one of the plurality of access points 124a to establish a first wireless connection. In an IEEE 802.11 system, RSSI is the relative received signal strength in a wireless environment. RSSI is an indication of the power level being received by the antenna. If, for example, the RSSI value of the first wireless connection falls below a threshold RSSI value (e.g., −75 dBm) during the first wireless connection or some other triggering event occurs, the radio 106 can automatically initiate a scan for additional access points with higher (less negative) RSSI values to maintain communication with the central station 126. This scan can occur concurrent with the first wireless connection (i.e., prior to the termination of the first wireless connection in order to enable a more rapid changeover, etc.). In some implementations, such scanning can additionally or alternatively be performed on a periodic basis (as opposed to in response to a trigger event). In the event that the RSSI signal falls below the threshold, the radio 106 will transmit a disassociate signal to the first access point 124a and an associate (or reassociate) signal to a second wireless access point 124b determined (concurrently with the first connection as will be described in further detail below) to be closer to the monitor 100 and have a higher RSSI. Upon authentication by the second wireless access point 124b, the monitor 100 will be able to bidirectionally communicate with the central station 126 via the second access point 124b to establish a second wireless connection.

Figure 2:
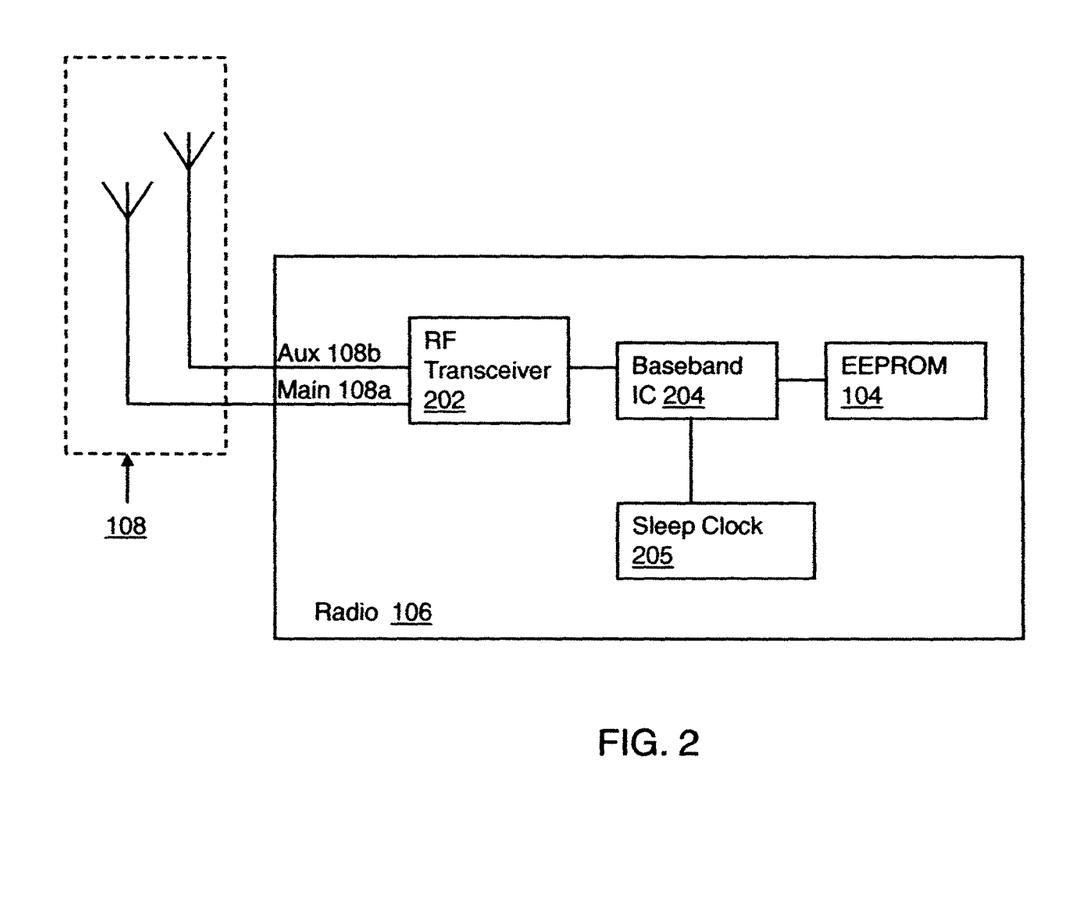
FIG. 2 is a schematic diagram of a patient monitoring telemetry system.

FIG. 2 is an exemplary block diagram of the radio 106 described above with respect to FIG. 1. The radio 106 can be a System-in-a-Package (SiP) that provides a low-power radio integrated circuit able to bidirectionally communicate according to any IEEE 802.11 protocol (e.g. 802.11a, 802.11b, 802.11g, 802.11n, and/or 802.11ac) including any amendments made thereto (e.g. 802.11d worldwide use, 802.11e QoS and 802.11i—WEP Alternative). The radio 106 can be formed as a no-host-load system architecture that enables the host to sleep while the radio 106 is in power save mode and is actively monitoring beacon packets from access points. An antenna 108 is electrically coupled to the radio 106. As shown herein, the antenna 108 can include a main antenna 108a and an auxiliary antenna 108b. The antennas 108a and 108b can, for example, be connected to an output of the radio 106 via micro coax cables terminating to a U.FL style connector at the feed point of the antennas. The radio 106 supports communication with the control processor 102 (FIG. 1) via a serial peripheral interface (SPI) bus (not shown). Alternatively, the radio can support communication with the control processor 102 via a secure digital input output (SDIO) card or Universal Asynchronous Receiver/Transmitter (UART). The crystal oscillator provides an accurate time source which drives the operation of the sleep clock 205. The sleep clock 205 determines a time at which the radio 106 should "wake up" in order to listen for and receive a beacon from an access point.

The radio 106 can include a Radio EEPROM 206 that includes instructions stored therein for controlling the operation of the radio 106. A baseband integrated circuit (IC) 204 can be coupled to the Radio EEPROM 206 and can selectively operate to control the frequency of the signals transmitted from and received by the radio 106. A sleep clock 205 can selectively control when the baseband IC 204 will awake from power save mode to scan for beacon packets originating from an access point 124a. For example, the sleep clock 205 can automatically wake the baseband IC at one hundred millisecond (100 ms) intervals to scan for beacon packets. A radio frequency (RF) transceiver 202 can be coupled to the baseband IC 204. The baseband IC 204 can cause the RF transceiver 202 to at least one of transmit and/or receive data. Additionally, the baseband IC 204 can control the RF transceiver 202 to scan for data representing beacon packets from at least one wireless access point.

In operation, the radio EEPROM 206 can include a set of instructions for switching the monitor 100 to monitor mode to supplement the threshold RSSI function described above. In monitor mode, the monitor 100 can perform network surveillance to capture and process data. Acquired information can be used by each monitor 100 in the network to make independent decisions regarding network activity actions in a dynamic, real-time manner. Examples of actions taken by the individual monitors 100 can include, but are not limited to, association/re-association/dissociation decisions, switching channels, switching access points, etc.

While a wireless network can realize in excess of 22M Bits/Second of data throughput, a typical wireless STA in a patient monitoring application requires less than 100 K Bits/second of data transmission between itself and an access point. As a device used in a patient monitoring application spends only a fraction of its normal operating time interacting with the network, the current subject matter takes advantage of this by allocating a percentage of the STA's processing time to perform a monitoring function (packet sniffing) of the wireless network (802.11) traffic activity.

The above-described multiplexed single receiver switched mode operation can be modified to include dual receiver concurrent parallel operation. For example, in the case where a single 802.11 receiver circuit is incorporated into the design the receiver circuit can alternate between a mode that passes all received packets to the device processor and one in which only certain data (e.g., medical application specific traffic, etc.) is passed. Alternatively, a design that incorporates two receiving circuits can be provided that uses one receiver in the mode for passing all received packets while the other operates narrowly with other data flows (e.g., the medical application flows, etc.).

Packet sniffing can be used to capture, intercept and/or log a variety of packet information. This packet sniffing information can be processed for purposes including, but not limited to: analyzing network problems (decide to change channels/access points); detecting network intrusion attempts/misuse (HIPAA); documenting regulatory compliance through logging all perimeter and endpoint traffic; monitoring WLAN bandwidth utilization (i.e. link performance); monitoring network usage; monitoring WAN and endpoint security status (HIPAA), and acquiring and reporting network statistics. To include packet sniffing as a function of a patient monitor monitoring device, a typical monitor 100 can be modified to program (e.g. EEPROM 104, control processor 102, radio 106) for dynamically switching in and out of RF monitor mode of packet reception. As such, the current subject matter utilizes available time slots to make assessments of the quality of potential connections between a STA and alternative access points. As noted above, such time slots are available in low data volume applications such as a patient monitoring application because a large volume of data transfer is not required for patient monitoring.

Figure 3:
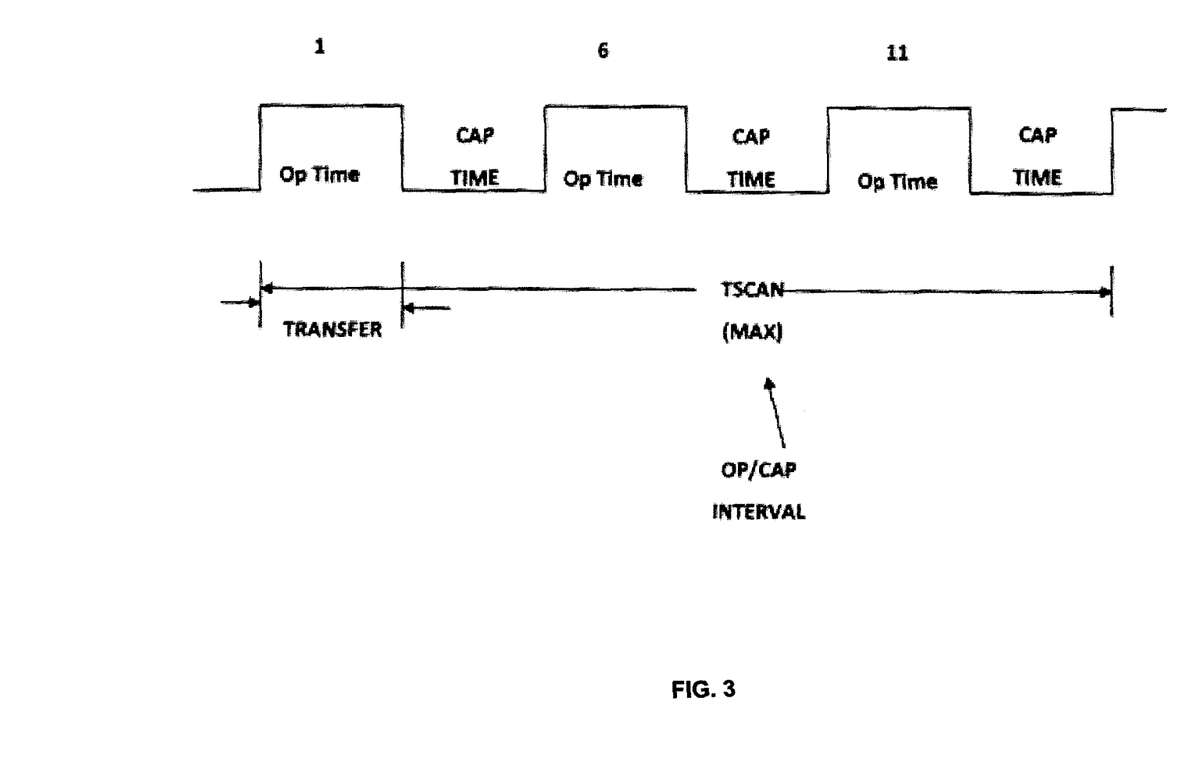
FIG. 3 is a TSCAN waveform according to aspects of the subject matter described herein.

As seen in the diagram 300 of FIG. 3, time slots in a given interval (TSCAN) can alternate between operational (OP) and capture (CAP) intervals. The OP intervals can be utilized for data transfer between a wireless STA and an access point with which the STA is currently associated (i.e. the OP intervals are used for normal patient monitoring Tx/Rx traffic). The CAP intervals can be utilized to acquire information about potential alternate access points beyond simply assessing signal strength of beacons from access points from which there is a current connection. For example, the CAP intervals can be used for acquiring network traffic over one or more channels from non-associated access points. This captured information can be used to make decisions to change (roam) to one of the alternate access points (or to stay with the current access point). Alternatively, the acquired information can be useful in characterizing channel usage. During RF monitor mode, the STA can capture information including, but not limited to: beacon frame information (used to predict when beacon frames will collide, etc.), retransmission rates, and noise level. It will be appreciated that the STA can monitor the packet traffic from other access points at any point during which there is low data exchange during the active connection (and that such points in time may not necessarily correspond to the above-described time slots).

The STA can capture data packets arriving from neighboring STA and access points on pre-defined scan channels. Based upon these acquired data packets, various parameters such as packet transmission rates and packet counts can be formulated and normalized to define network utilization figures (in some cases weighted by other parameters such as re-transmission rates, etc.) in order to produce a number against which a threshold criteria is applied which then results in a decision which mandates a network-based action such as to form a new and more favorable association, in other words roam/changeover. The defined network utilization figures can also be used to generate data transmission profiles for each access point. A list of valid candidate access points to which the device might changeover would also need to consider consistency with the more roaming criteria based exclusively on Received Signal Strength Indication (RSSI) measurements from the access point of current association. According to some aspects, for a load balancing algorithm to possess a good degree of reliability, the STA includes positional information, including, for example, whether the STA is relatively stationary or not. For further information regarding positional information, see the next section describing "Spatial Profiling."

Spatial Profiling.

The STA can extract features of the network environment from captured packet information that allows the STA to determine whether the device is stationary or moving and/or whether the current location is one in which the device has been in previously or not. This can be accomplished, for example, using a triangulation method based on receive power (RSSI) from stationary access point beacons, for example.

One example is to correlate a parameter such as packet retransmission rates with positional information and a measure of STA's own link performance Three values can be obtained for each access point: location, retransmission rate, and application throughput. As mentioned above, location can be obtained by using a triangulation method including methods that utilize the received power value of a transmission of an access point. Retransmission can be identified by a flag contained within a packet header structure. Therefore, retransmission rate can be obtained by counting the number of received packets from an access point containing retransmission flags within a given period of time. Discussing the location value in more detail, positional information can be determined by building a list of access points within active channels within a given infrastructure and establishing an average measure of received beacon signal strength. Each item in the list can serve as a positional coordinate, assumed to be unique at the station's absolute position. Determining that the station is relatively stationary can be used to certify that the retransmission statistic is reliable. Determining a minimal change in the access point list's RSSI values (the positional coordinate) would then lead to a measure and recording of retransmission rates for the operating channel at the measurement location. Retransmission rates are an indicator that device throughput is being hampered. This can be due to a number of causes. The retransmission rate figure, along with the operating channel, serves as a second coordinate in the scheme. The last coordinate can be a measure of the station's application throughput used as a measure of performance. This can be an attribute more easily exploited in applications such as patient monitoring where packets containing data for display and processing of physiological waveform data, like EKG are expected to maintain an average throughput figure with an absolute limit on maximum time between data packet transmissions (i.e. latency).

Preserving the three coordinates of location, retransmission and application throughput in non-volatile memory can allow the STA, over long periods of operation (a learning process) within a given infrastructure, to form associations with access points based on known and persistent performance data. For example, given a current location of the patient monitor, the device can: look up the access points that are closest to the STA; calculate a value by performing a weighted sum of the retransmission rate and throughput rate (which could form part of a data transmission profile); and choose the access point with the highest weighted sum (and/or best data transmission profile). This approach to forming associations provides an enhanced changeover as compared to solely using signal strength alone.

Coincident Beacon Avoidance.

A Coincident Beacon Avoidance algorithm can be used by the STA to address problems that may be associated with two beacons transmitted by independent access points (AP) on the same channel. For example, a beacon collision could occur if the beacon from an AP that is not associated with the STA arrives at the STA at or near the same time as the beacon from the AP that is associated with the STA. If the energy of the beacon from the unassociated AP is greater than or approximately the same energy at the STA (e.g. client, etc.) point of reception as the energy of the beacon from the associated AP, then the latter beacon will not be recognized by the STA. This occurs, for example, because two APs may not be able to receive each other's beacon transmissions, whereas the STA in the middle can receive either one. In this situation, each AP would not be aware of the other's existence and thus would be unable to prevent a beacon collision by adjusting the timing of its beacon.

In accordance with Carrier Sense Multiple Access/Collision Avoidance, this protocol can require all WLAN devices to determine whether or not another node is transmitting on the channel within the wireless range before transmitting to reduce the probability of a collision. For example, since the wireless medium is shared, the scheme attempts to prevent multiple devices from transmitting at the same time and thus interfering with one another. For APs, this can work if the APs can receive data traffic from each other. The station midway between them, from a receive power standpoint, cannot properly decode packet information from either AP thus possibly missing critical management or control packets for extended periods of time.

In the above-described scenario, when two beacons collide, the CSMA/CA protocol is prevented from being applied at either access point to avoid contention in the shared medium. Additionally, each access point can transmit on a predetermined, fixed schedule that can be measured by its own circuit oscillator (clock) which has a tolerance attached. The specified, nominal frequency of the oscillator deviates from center based on temperature and age. Accordingly, beacons issued at a globally set rate of 100 ms will "slide through" with one another over time, occurring with a period determined by the difference in frequency between the base oscillators. The slower the slide, the longer the overlap of the beacon frames in time. This is important when access points cannot receive each other and the energy at the receive point is approximately equal. This is a unique combination of things; however, it has been observed during use of portable monitors in the field. This can be devastating to a device that relies on beacon arrival to accomplish power save operation, for example.

To avoid the above-identified problem for a power saving STA, the STA can sample and adds its own timestamp information to beacons arriving from all nearby access points (those with RSSI above roaming threshold) and can extract time of transmission information that is present in the beacon packets. Receive time differences taken in ratio with transmit time differences can produce a drift rate figure for the access point relative to the STA's time base. It follows that similar drift figures for other access points then allows for the prediction for where in time a coincident reception of beacons will occur and the problem can be avoided by either forming a new association with an available access point, (i.e. one that is not about to create the predictable contention) or to transition to an Active mode of operation that does not rely on beacon arrival, for example, and stay in that mode for a predicted duration equal to the time of overlap.

Figure 4:
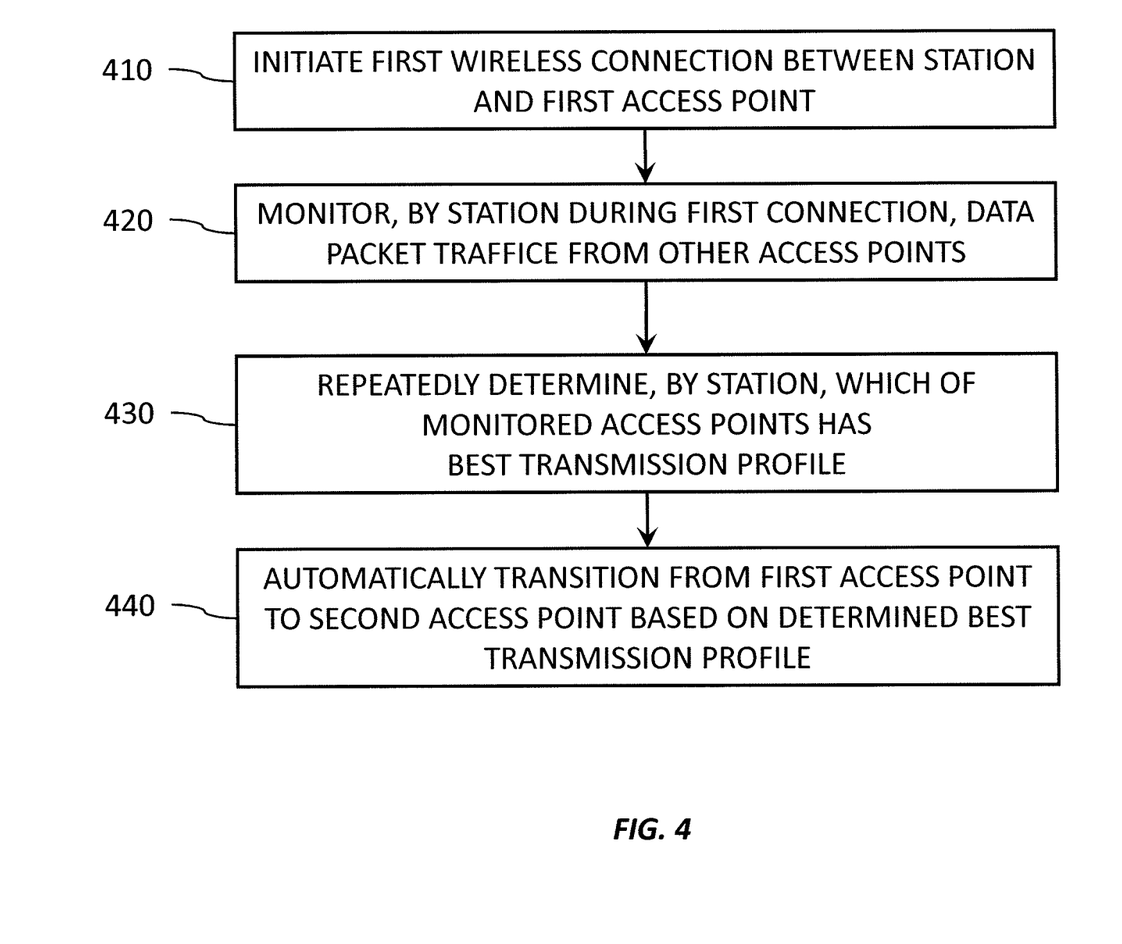
FIG. 4 is a process flow diagram illustrating context aware changeover among access points.

FIG. 4 is a process flow diagram 400 illustrating context aware wireless data access point changeover. A first wireless connection is initiated, at 410, between a station and a first access point. During this first wireless connection, the station, at 420, monitors data packet traffic from other access points (other than the first access point). As part of this monitoring, the station repeatedly determines, at 430, which of the other access points provides a best data transmission profile (described below). Thereafter, the station, at 440, automatically transitions from the first wireless connection to a second wireless connection with the access point having the most recently determined best data transmission profile upon occurrence of a trigger event or a termination of the first wireless connection.

As used herein, the term data transmission profile characterizes one or more attributes of connectivity associated with another access point at a given point in time (these profiles can be static or they can dynamically change based, for example, on the relative positions, etc.). These attributes can comprise measured characteristics using, for example, beacon signals or other intercepted packets or they can comprise characteristics calculated using, for example, the measured characteristics. The attributes can also include various other parameters such as user preferences, access point grouping, type of access point (e.g., public vs. private), time of day, known bandwidth limitations, and the like. The various attributes can be used to determine which of the access points has the best or optimal transmission profile at any given time. The attributes can be weighted and relative scores/values can be calculated to identify which access point has the best transmission profile at any given time.

The trigger event can comprise any event that might affect the first wireless connection. For example, the strength of the signal from the first access point falling below a predetermined threshold, the strength of the signal from the first access point falling below a pre-determined ratio as compared to the signal from one or more of the other access points, the position of the station in relation to the first access point and/or the position of the station in relation to other access points.

Moreover, historical changeover information can be utilized as part of the determination of whether a triggering event has occurred. For example, historical changeover information can show that when the signal strength from a first access point drops as the signal strength from a second access point, a third access point will soon become available. This scenario could happen, for example, when a user is carrying the STA down a hallway. Stated differently, geo-fenced boundaries can be determined using various modeled signal strengths from the access points so that moving the station across one of such boundaries is a triggering event causing the station to transition to another access point.

Triggering events can also be based on user preferences that prioritize which access point to use based on signal strength. These priority lists can be based, for example, based on which particular access point has the strongest signal. So a prioritized ranking of access points for changeover positions can change based on which access point has the strongest signal strength (e.g., when AP1 has highest signal strength, ranking is AP1, AP3, AP4, AP2—whereas when AP4 has highest signal strength, ranking is AP4, AP2, AP1, AP3). Prioritizations amongst access points can also be dynamic based, for example, on grouping criteria relating to the type of access point (e.g., public vs. private, etc.).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

The invention claimed is:

1. A method comprising:
    initiating a first wireless connection between a station and a first access point;
    monitoring, by the station during the first wireless connection, data packet traffic from other access points;
    repeatedly determining, by the station using the monitored data packet traffic and during the first wireless connection, which of the other access points provides a best data transmission profile, wherein the station alternately operates in an active mode in which it transmits and receives data via the first wireless connection and in a monitor mode in which it only monitors the data packet traffic from other access points, wherein the station switches to the monitoring when data traffic on the first wireless connection falls below a pre-determined threshold; and
    automatically transitioning, by the station, from the first wireless connection to a second wireless connection with the access point having the most recently determined best data transmission profile upon occurrence of a trigger event or a termination of the first wireless connection;
    wherein the monitored packet traffic comprises beacon packets transmitted by the access points, and wherein the determining comprises:
        assigning timestamp information associated with the station to each of the beacon packets arriving from access points within range, the timestamp information comprising arrival time and beacon interval for each beacon packet transmission,
        calculating a drift rate based on relative differences in the timestamp information corresponding to each beacon packet in comparison with the timestamp information corresponding to other beacon packets, and
        selecting an access point as having the best data transmission profile based on the calculated drift rate.

2. A method as in claim 1, wherein the station while in the monitor mode receives the monitored data packet traffic via radio frequency.

3. A method as in claim 1, wherein the station communicates with the access points via at least one IEEE 802.11 protocol.

4. A method as in claim 3, wherein the at least one IEEE 802.11 protocol is selected from a group consisting of IEEE 802.11a protocol, IEEE 802.11b protocol; IEEE 802.11d protocol; IEEE 802.11g protocol; IEEE 802.11i protocol, IEEE 802.11n protocol, and IEEE 802.11ac protocol.

5. A method as in claim 1, wherein the monitored data packet traffic comprises packets selected from a group consisting of: broadcast packets, multicast packets, TCP (Transmission Control Protocol) packets, UDP (User Datagram Protocol) packets, ARP (Address Resolution Protocol) packets, ICMP (Internet Control Message Protocol) packets, DHCP (Dynamic Host Configuration Protocol) packets, DNS (Domain Name System) packets, and RIP (Routing Information Protocol) packets.

6. A method as in claim 1, wherein the identified location of the station is determined using a triangulation method based on variations over time in power corresponding to the monitored data packet traffic.

7. A method as in claim 1, wherein the station is a patient monitoring device that is coupled to at least one sensor device measuring at least one physiological parameter of a patient.

8. A method as in claim 1, wherein the monitoring occurs when data traffic on the first wireless connection falls below a pre-determined threshold.

9. A method as in claim 1 further comprising:
    ranking available data transmission profiles; and
    wherein the best data transmission profile is based on a ranking of the available access points.

10. A method as in claim 9, wherein the ranking is based on historical connections by the station with one or more of the available access points.

11. A method as in claim 9, wherein the ranking is based on a determined position of the station relative to one or more of the available access points.

12. A non-transitory computer program product storing instructions, which when executed by at least one data processor forming part of at least one computing system, result in operations comprising:
    initiating a first wireless connection between a station and a first access point;
    monitoring, by the station during the first wireless connection, data packet traffic from other access points, wherein the station alternately operates in an active mode in which it transmits and receives data via the first wireless connection and in a monitor mode in which it only monitors the data packet traffic from other access points, wherein the station switches to the monitoring when data traffic on the first wireless connection falls below a pre-determined threshold;
    repeatedly determining, by the station using the monitored data packet traffic and during the first wireless connection, which of the other access points provides a best data transmission profile; and
    automatically transitioning, by the station, from the first wireless connection to a second wireless connection with the access point having the most recently determined best data transmission profile upon occurrence of a trigger event or a termination of the first wireless connection;
    wherein the monitored packet traffic comprises beacon packets transmitted by the access points, and wherein the determining comprises:
        assigning timestamp information associated with the station to each of the beacon packets arriving from access points within range, the timestamp information comprising arrival time and beacon interval for each beacon packet transmission,
        calculating a drift rate based on relative differences in the timestamp information corresponding to each beacon packet in comparison with the timestamp information corresponding to other beacon packets, and
        selecting an access point as having the best data transmission profile based on the calculated drift rate.

13. A system comprising:
    at least one station comprising a wireless transceiver for initiating data communications with one or more of a plurality of access points; and wherein:
the station initiates a first wireless connection with a first access point;
the station, during the first wireless connection, monitors data packet traffic from other access points;
the station alternately operates in an active mode in which it transmits and receives data via the first wireless connection and in a monitor mode in which it only monitors the data packet traffic from other access points;
the station switches to the monitoring when data traffic on the first wireless connection falls below a pre-determined threshold;
the station repeatedly determines which of the other access points provides a best data transmission profile; and
the station automatically transitions from the first wireless connection to a second wireless connection with the access point having the most recently determined best data transmission profile upon occurrence of a trigger event or a termination of the first wireless connection;
wherein the monitored packet traffic comprises beacon packets transmitted by the access points, and wherein the determining by the station comprises:
assigning timestamp information associated with the station to each of the beacon packets arriving from access points within range, the timestamp information comprising arrival time and beacon interval for each beacon packet transmission,
calculating a drift rate based on relative differences in the timestamp information corresponding to each beacon packet in comparison with the timestamp information corresponding to other beacon packets, and
selecting an access point as having the best data transmission profile based on the calculated drift rate.

14. A system as in claim 13, wherein the determining further comprises: analyzing the monitored data packet traffic to identify spatial profiling information contained in corresponding data packets which is representative of variations over time of network transmission performance, the spatial profiling information comprising at least one of an identified location of the station, data throughput rate throughout the network, and data retransmission rate throughout the network, and selecting an access point as having the best data transmission profile based on the analyzed spatial profiling information.

15. A system as in claim 13, wherein the station while in the monitor mode receives the monitored data packet traffic via radio frequency.

16. A system as in claim 13, wherein the station communicates with the access points via at least one IEEE 802.11 protocol.

17. A system as in claim 16, wherein the at least one IEEE 802.11 protocol is selected from a group consisting of IEEE 802.11a protocol, IEEE 802.11b protocol; IEEE 802.11d protocol; IEEE 802.11g protocol; IEEE 802.11i protocol, IEEE 802.11n protocol, and IEEE 802.11ac protocol.

18. A system as in claim 13, wherein the monitored data packet traffic comprises packets selected from a group consisting of: broadcast packets, multicast packets, TCP (Transmission Control Protocol) packets, UDP (User Datagram Protocol) packets, ARP (Address Resolution Protocol) packets, ICMP (Internet Control Message Protocol) packets, DHCP (Dynamic Host Configuration Protocol) packets, DNS (Domain Name System) packets, and RIP (Routing Information Protocol) packets.

19. A system as in claim 13, wherein the identified location of the station is determined using a triangulation method based on variations over time in power corresponding to the monitored data packet traffic.

20. A system as in claim 13, wherein the station is a patient monitoring device that is coupled to at least one sensor device measuring at least one physiological parameter of a patient.

21. A system as in claim 13, wherein the monitoring occurs when data traffic on the first wireless connection falls below a pre-determined threshold.

* * * * *